United States Patent [19]
Christiansen

[11] 3,864,075
[45] Feb. 4, 1975

[54] APPARATUS FOR BURNING GRANULAR OR PULVEROUS MATERIAL

[75] Inventor: Soren Bent Christiansen, Copenhagen Valby, Denmark

[73] Assignee: F. L. Smidth & Co., Cresskill, N.J.

[22] Filed: Apr. 29, 1974

[21] Appl. No.: 464,964

[30] Foreign Application Priority Data
Apr. 30, 1973 Great Britain.................... 20463/73

[52] U.S. Cl..................... 432/106, 34/57 R, 432/58
[51] Int. Cl.............................................. F27b 7/02
[58] Field of Search ........ 432/14, 58, 106; 34/57 R, 34/57 E

[56] References Cited
UNITED STATES PATENTS

| | | | |
|---|---|---|---|
| 1,817,048 | 8/1931 | Washburn............................ | 34/57 R |
| 3,037,757 | 6/1962 | Deussner ................................ | 34/57 |
| 3,452,968 | 7/1969 | Shimizu et al. ....................... | 432/58 |
| 3,664,650 | 5/1972 | Weber et al. .......................... | 432/58 |
| 3,744,962 | 7/1973 | Ritzmann.............................. | 432/58 |

*Primary Examiner*—John J. Camby
*Attorney, Agent, or Firm*—Pennie & Edmonds

[57] ABSTRACT

A plant is disclosed for burning granular or pulverous material, particularly in the form of cement raw materials to be burnt to cement clinker. A preheater comprises at least two cooperating units, each with its own heating gas or air inlet and outlet and raw material inlet. A kiln to which preheated raw material is fed from the preheater has associated cooling means for cooling material burnt in the kiln. Heated cooling air leaving the cooling means is divided such that a part is led as combustion air to the kiln and a part is led to the air inlet of one preheater unit, the gas inlet of the other preheater unit being connected to an exhaust gas outlet from the kiln, and each unit each having at or near its gas or air outlet, its own means for controlling the air or gas flow through that unit and hence the division of the heated cooling air.

19 Claims, 3 Drawing Figures

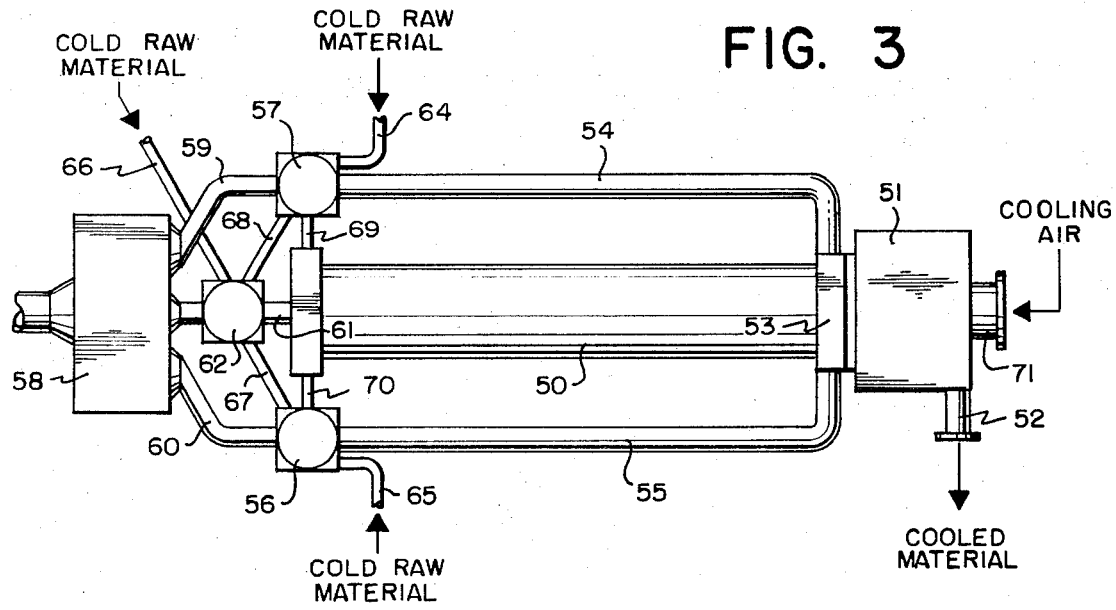

APPARATUS FOR BURNING GRANULAR OR PULVEROUS MATERIAL

BACKGROUND OF THE INVENTION

1. Field of the Invention

The invention relates to improvements in plants for burning granular or pulverous material, particularly for burning cement raw materials to cement clinker in a kiln having a preheater associated therewith.

2. Description of the Prior Art

Various constructions of such plants for burning and sintering of ores, lime and cement raw materials are known. Most frequently a preheater consists of a number of cyclones through which the raw material passes in one direction from the inlet to the outlet in a heat exchange process with the waste gases from the rotary kiln passing in the opposite direction through the preheater to a dust precipitator, such as an electrostatic precipitator, positioned after the preheater and before a chimney.

Coolers for cooling the material burnt in the rotary kiln by means of cooling air are likewise also well known. For example, such coolers may be in the form of a planetary cooler or coolers associated with the rotary kiln, or in the form of a stationary grate cooler into which the rotary kiln discharges the hot material. The cooling air utilized in the cooler is, through the heat exchange, brought to a rather high temperature so that the heated cooling air has a high heat content, which is important to recover. The heated cooling air is therefore utilized as secondary combustion air in the burning process performed in the rotary kiln.

A part of the heated cooling air may be utilized for heat exchange in the preheater for the raw material by the provision of an air duct from the cooler to the preheater and mixing the air with the smoke gas from the rotary kiln. Further, a part of the heated cooling air may be used in an additional burning process performed in combination with the preheating of the raw material and with the addition of fuel in order to obtain a partly or fully calcined product in the preheater installation, thus permitting a reduction in the size of the rotary kiln. However, since the temperature of the heated cooling air may be rather high, i.e., from a grate cooler of the order of 600° to 700°C and from a planetary cooler from 800° to 900°C, control of the amounts of smoke gas from the rotary kiln and the heated cooling air from the cooler with a view to obtaining a preferred ratio in the total amount has hitherto not been possible because of the high temperatures at the outlets for gas from the rotary kiln and of air from the cooler. Equipment for adjustments such as dampers or valves cannot be installed to operate properly in the ducts. I have invented a plant which eliminates these problems by controlling the ratio of gas and air flowing through separate units of the plant.

SUMMARY OF THE INVENTION

The invention relates to a plant for burning granular or pulverous material comprising a preheater having at least two cooperating units, each unit having its own inlet and outlet for heating gas or air and with its own raw material inlet. The plant further comprises a kiln having means for feeding preheater raw material from said preheater and cooling means associated with said kiln for cooling material burnt therein, with means for dividing said heated cooling air such that a portion is directed as combustion air to said kiln and a portion is directed to an inlet of at least one preheater unit. The plant further comprises means for connecting the gas inlet of the other preheater unit to an exhaust gas outlet of said kiln and means associated with each preheater unit at or near its gas or air outlet for controlling the air or gas flow through each associated unit and hence the division of the heated cooling air.

The total amount of cooling air and smoke gas is substantially constant. In order to obtain the best possible heat economy, the division of the two flows of the heated cooling air — one to the rotary kiln for the combustion performed therein, and the other to the preheater — has to be optimum. By keeping the flows separated until they are cooled down by the raw materials, it is possible by means installed at or near their outlets to control the divisional flows separately as will be seen in the description which follows:

It will be seen that at the outlets for gases from the preheater units the temperature is sufficiently reduced that, without any risk of damage due to heat, various control equipment for controlling the passages through the ducts such as dampers, valves or fans may be installed to unite the gas or air flows. These flows are subsequently dedusted in a dust precipitator, preferably in the form of an electrostatic precipitator, prior to being fed into the atmosphere through a chimney or a vent.

An efficient control of both gas or air flows is thus established at or near the gas or air outlets from the preheater units. It is therefore ensured that the burning process in the rotary kiln, as well as the preheating or partial burning process in the separate burning chamber, may be effectively balanced to utilize the heat contents in the most economical manner. The flows may thereafter be joined into a common waste gas flow before dedusting of the waste gas is carried out. For example, before the waste gas is fed to the atmosphere through a chimney or vent it is preferably dedusted in an electrostatic precipitator. Thus the exact amount of air necessary for the combustion in the rotary kiln may be controlled in this manner and the heat contents of the rest of the cooling air may be utilized for preheating without influencing the air-fuel balance of the rotary kiln.

In a preferred embodiment at least one of the preheater units is provided with means for increasing the heat content of the air or gas fed to the unit preferably by the provision of a burning chamber at the air or gas inlet having means for an additional introduction of fuel. In addition, if the plant is of a moderate size, it might be convenient to reduce the preheater installation in order to reduce the cost of same. In either case it may nevertheless be constructed according to the principles of the present invention.

Thus, in an alternate embodiment a smaller production may be provided wherein the waste gas or air outlet from a secondary preheater unit is connected to a primary preheater unit at a point between the inlet and the outlet for gas or air for the primary unit. This construction includes means for controlling the gas or air flow through each unit upstream of the connection. The secondary preheater unit may in that case be reduced to a single cyclone having a raw material inlet only in the gas or air pipe leading to the cyclone. Sufficient amounts of cold raw material may reduce the temperature of the gas or air during its flow through the cyclone so that regulating equipment may be installed immediately after the cyclone to control the gas or air flow, preferably the smoke gas flow from the kiln, and thereby control the burning process in the kiln.

In the alternate embodiment of smaller construction the preheated raw material from the primary unit may be fed directly to the kiln. However, according to one feature of the invention the preheater unit or units which are connected to the kiln gas outlet may also have means for discharging the preheated or partly or fully calcined material into the preheater unit or units combined with the outlet for the heated cooling air either at the inlet or at a point between the inlet and the outlet for the material treated therein. Thus the raw material fed to the secondary unit — in addition to being preheated itself — performs an important function by cooling one of the gas or air streams sufficiently to allow the installation of regulating equipment in at least one of the gas or air ducts. With this arrangement the preheated flow of raw material may advantageously be united with the main raw material stream passing through the primary preheater unit to be further preheated or partly or fully calcined in a heat exchange process or in a burning chamber associated with the primary preheater unit. The cost of the installation is thereby reduced as only a part of the equipment need be doubled to arrange a by-pass in which a temperature reduction of the gas flow from the rotary kiln or of the heated cooling air flow can be performed.

BRIEF DESCRIPTION OF THE DRAWINGS preferred embodiments of the invention are described hereinbelow with references to the drawings wherein:

FIG. 3 is a top view of a complete plant for burning raw material

DETAILED DESCRIPTION OF THE PREFERRED EMBODIMENTS

Figure 1:
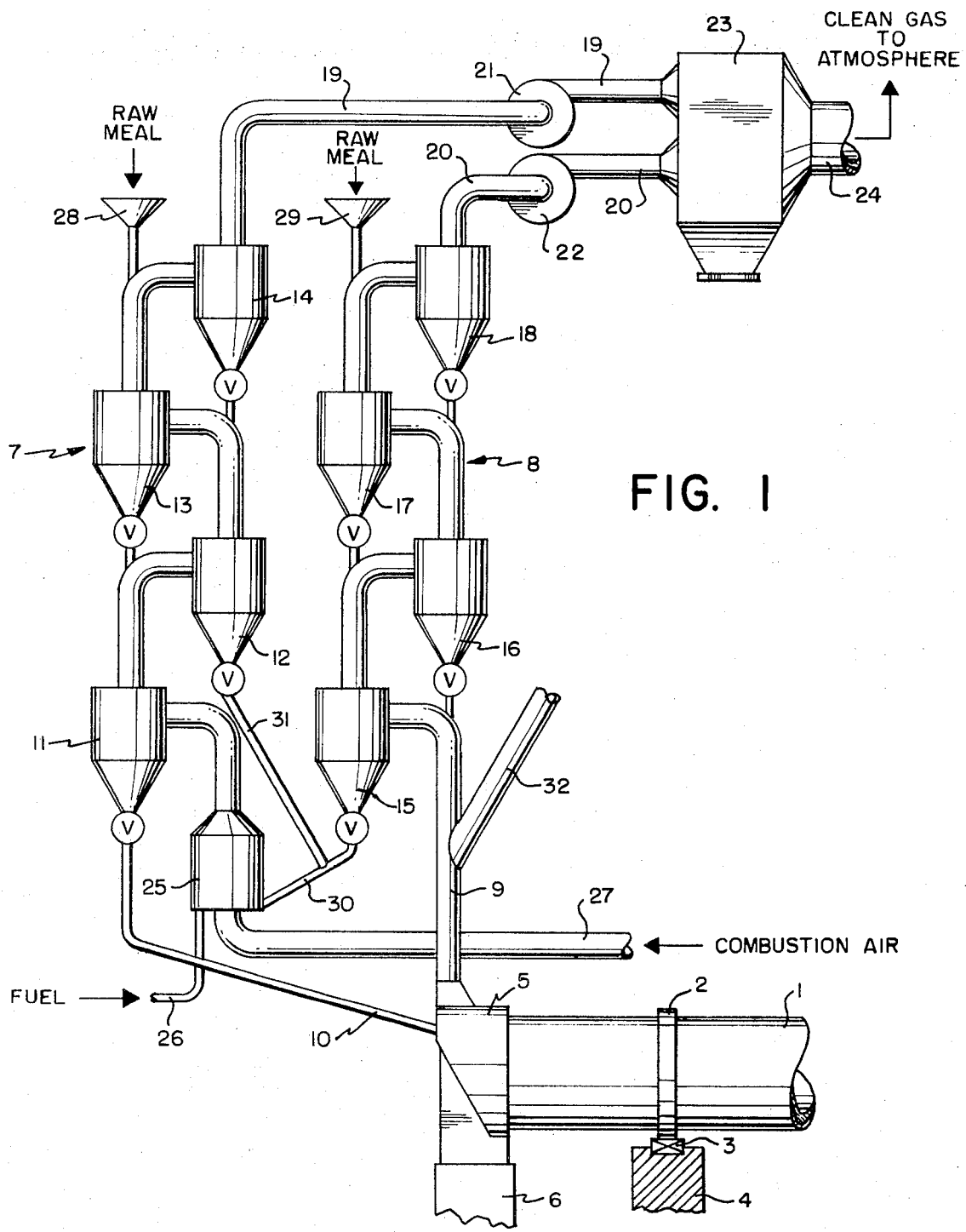
FIG. 1 is a side elevational view of a preheater and the upper end of a rotary kiln.

In FIG. 1, a rotary kiln 1 has a live ring 2, supported by means of bearing rollers 4 on the foundation 4. The gas outlet end of the rotary kiln 1 has a smoke gas chamber 5 supported by another foundation 6.

The rotary kiln is connected with a preheater comprising two units 7 and 8 of which one unit 8 is connected to a smoke gas outlet duct 9 of the rotary kiln and the material outlet pipe 10 of the other unit 7 is connected to the rotary kiln. Both preheater units 7 and 8 comprise a number of series-connected cyclones 11, 12, 13, 14 and 15, 16, 16, 18 with corresponding riser pipes through which gas and material pass counter-currently in succession.

The preheater units have separate gas outlet tubes 19 and 20 each with a fan 21 and 22, the tubes leading to an electrostatic precipitator 23, from which the cleaned gas may pass to the atmosphere through an outlet 24.

The preheater unit 7 has at its bottom a burning chamber 25 with a fuel pipe 26 and a connecting tube 27 for the supply of combustion air. The tube 27 is connected to the cooler at the outlet end of the rotary kiln. The cooler for the burnt material is not shown on the drawing and may be of any conventional design.

In operation raw material to be burnt in the rotary kiln 1 is fed to the preheaters 7 and 8 at the inlets 28 and 29. The preheated raw material from the preheater unit 8 passes through a pipe 30 into the burning chamber 25 and also the raw material from the preheater 7 is passed to the burning chamber 25 by means of the pipe 31. The smoke gas outlet duct 9 from the rotary kiln has a by-pass 32 for removal of alkalis or for by-passing smoke gas or part thereof during starting up of the plant or during emergency.

The raw material to be treated in the plant is fed to the preheater through the feed pipes 28 and 29 by means of dosing equipment not shown in the drawing. The dosing equipment may adjust the amounts fed to the plant and the proportion between the two preheater units 7 and 8.

During its passage down through the individual cyclone stages the raw material is treated in a heat exchange process by the gases passing through riser pipes leading tangentially into the cyclones. The preheated raw material is passed through the pipes 30 and 31 to the burning chamber 25 in which a preliminary burning or calcining takes place by means of a suitable amount of fuel. For instance fuel oil may be added through the fuel pipe 26. The product is finally separated off in the cyclone 11 and fed to the rotary kiln through the pipe 10.

The smoke gas from the rotary kiln 1 is discharged through the smoke gas duct 9 leading to the preheater unit 8 and the flow of gas is controlled by means of the fan 22. The other preheater unit 7 is connected to the air outlet from the cooler for cooling the material burnt or sintered in the rotary kiln, and uses a part of the heated cooling air. Another part of the heated cooling air is supplied to the rotary kiln. The amounts of heated cooling air passed through the systems 7 and 8 are controlled by the fans 21 and 22.

The smoke gas discharged from the kiln may have a temperature of about 1,200°C and the heated cooling air a temperature of about 800°C so that equipment to control the streams of air and gas cannot withstand the conditions before the preheater. According to the present invention, the fans 21 and 22 installed after the air and gases have been cooled down by the heat exchange process taking place in the preheater units are only exposed to low temperatures of the order 300°C.

As a result of dividing the preheater in this manner the fans 21 and 22 may divide the heated cooling air from the cooler pro rata according to the amounts required for the combustion in the rotary kiln, and at the same time the raw material may be divided to the preheater units to obtain the most economical heat exchange dependent on the amounts of gas available through the two units and the gas temperature. A control arrangement which couples the raw meal fed ratio with the fan control may be advantageously employed.

Figure 2:
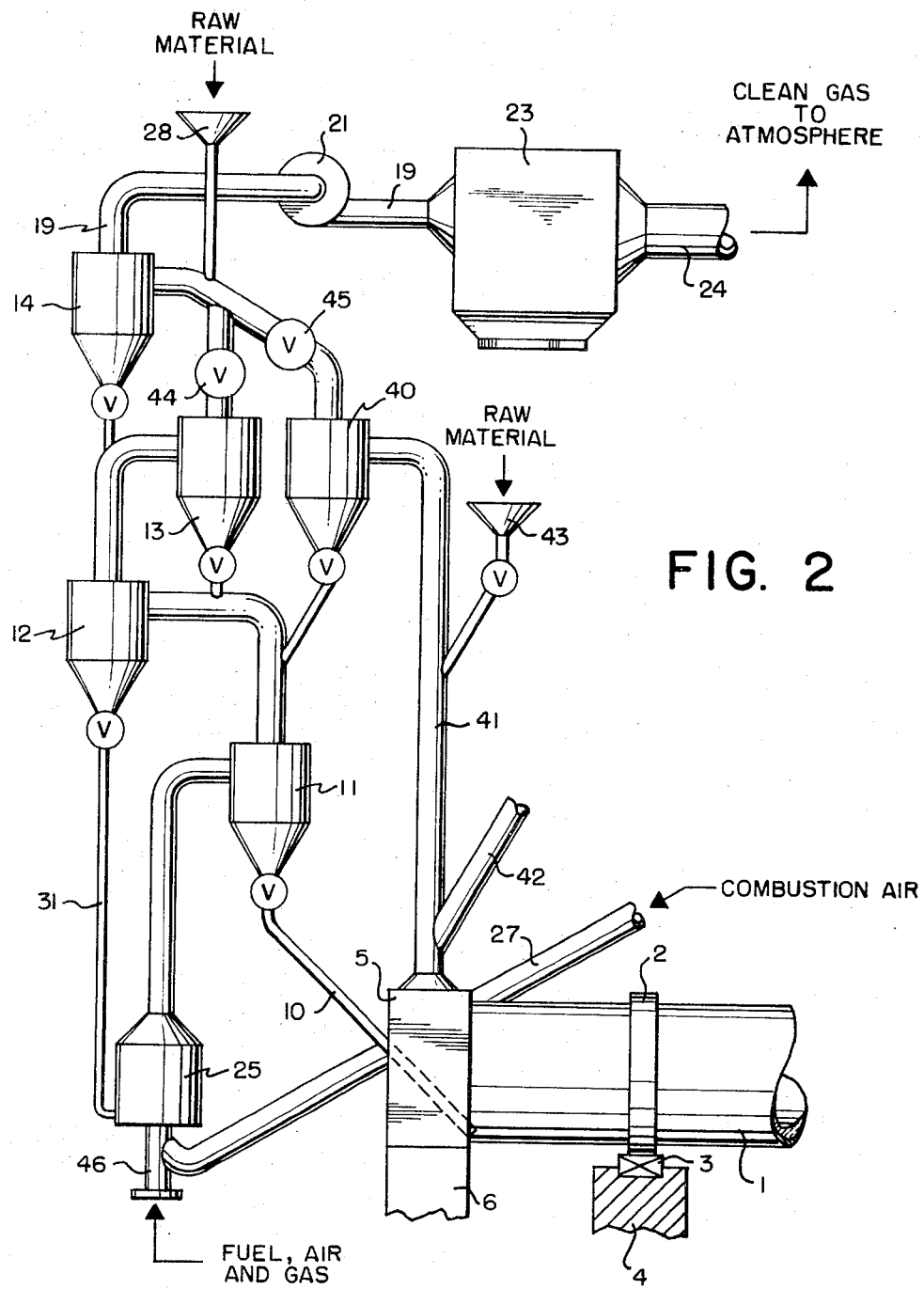
FIG. 2 is a side elevational view of an alternate embodiment of the present invention.

In the relatively small capacity plant illustrated in FIG. 2 a preheater unit generally comprises the same components as the preheater unit of the plant shown in FIG. 1 and these components are numbered correspondingly, only one cyclone 40 being added. The cyclone 40 is connected to the gas outlet from the rotary kiln 1 by means of a smoke gas duct 41 (corresponding to duct 9 in FIG. 1). The smoke gas duct has a by-pass marked 42 and a feed pipe 43 for raw material. Both units are provided with valves 44 and 45 to control the gas flows.

Although the temperature of the smoke gas leaving the rotary kiln may be about 1,200°C the cold raw meal fed through the feed pipe 43 is able to bring the temperature down to an acceptable level at the valve 45.

The two valves 44 and 45 may, in a suitable manner, adjust the ratio for the amount of the heated cooling air which passes through the kiln as combustion air and the amount which passes through the burning chamber 25 and subsequently through the associated preheater unit. In addition the burning chamber 25 has an inlet 46 which may serve as an inlet for fuel and, if required, extra air or gas.

The complete plant shown as a layout in FIG. 3 has a rotary kiln 50, a conventional cooler 51 for air cooling the material burnt or sintered in the rotary kiln 50. The cooler 51 has an outlet 52 for the cooled material and an outlet chamber 53 for the heated cooling air from which one part of the cooling air passes to the rotary kiln 50 and another part passes through the tubes 54 and 55 to two separate preheater units 56 and 57 and from there to a common electrostatic precipitator 58 through the gas ducts 59 and 60. The smoke gas from the rotary kiln 50 passes through the duct 61 to a third preheater unit 62 and from there it is brought together with the gas flows from the other units in the electrostatic precipitator 58 by means of the duct 63. The preheater units have feed pipes 64, 65 and 66 for feeding cold raw material and the preheated raw material from the unit 62 is fed as flows to the preheater units 56 and 57 through the pipes 67 and 68.

The preheater is built up of cyclones by the units 56 and 57 are each also equipped with a burning chamber of the kind described previously. From the preheater units the preheated raw material having passed the burning chambers is fed to the rotary kiln through the pipes 69 and 70. Cooling air is admitted to the cooler 51 through the opening 71.

The plant shown in FIG. 3 is constructed in principle in the same manner and of the same components as the plant shown in FIG. 1, but by splitting the heated cooling air and by dividing the preheater as illustrated the plant is suitable for treating large quantities of material and may be adapted for plants having a very high production capacity.

I claim:

1. A plant for burning granular or pulverous material comprising a preheater having at least two cooperating units, each unit having an inlet and an outlet for heating gas or air and a raw material inlet, a kiln having means for feeding preheated raw material from said preheater, cooling means associated with said kiln for cooling material burnt therein, means for dividing said heated cooling air such that a portion is directed as combustion air to said kiln and a portion is directed to an inlet of at least one preheater unit, means for connecting the gas inlet of said other preheater unit to an exhaust gas outlet of said kiln, and means associated with each preheater unit at or near its gas or air outlet for controlling the air or gas flow through each associated unit and the division of the heated cooling air.

2. The plant according to claim 1 wherein at least one of the preheater units comprises means for increasing the heat content of the air or gas fed to that unit.

3. The plant according to claim 2 wherein said means for increasing the heat content comprises a burning chamber at the air or gas inlet having means for introducing fuel therein.

4. The plant according to claim 1 wherein the preheater units further comprise means for feeding their waste gas or air jointly to an electrostatic precipitator for dedusting said gases.

5. The plant according to claim 2 wherein the preheater units further comprise means for feeding their waste gas or air jointly to an electrostatic precipitator for dedusting said gases.

6. The plant according to claim 3 wherein the preheater units further comprise means for feeding their waste gas or air jointly to an electrostatic precipitator for dedusting said gases.

7. The plant according to claim 1 further comprising means to direct the waste gases from one preheater unit to another preheater unit at a point between the inlet and the outlet of the other unit, and further comprising means for controlling the gas or air flow through each unit upstream of said connection.

8. The plant according to claim 2 further comprising means to direct the waste gases from one preheater unit to another preheater unit at a point between the inlet and the outlet of the other unit, and further comprising means for controlling the gas or air flow through each unit upstream of said connection.

9. The plant according to claim 3 further comprising means to direct the waste gases from one preheater unit to another preheater unit at a point between the inlet and the outlet of the other unit, and further comprising means for controlling the gas or air flow through each unit upstream of said connection.

10. The plant according to claim 4 further comprising means to direct the waste gases from one preheater unit to another preheater unit at a point between the inlet and the outlet of the other unit, and further comprising means for controlling the gas or air flow through each unit upstream of said connection.

11. The plant according to claim 1 wherein at least one of said preheater units connected to said kiln gas outlet further comprises means for discharging preheated material into at least one of said preheater units connected to said cooling means at the inlet or at a point between the inlet and the outlet for material treated in said preheater unit.

12. The plant according to claim 2 wherein at least one of said preheater units connected to said kiln gas outlet further comprises means for discharging preheated material into at least one of said preheater units connected to said cooling means at the inlet or at a point between the inlet and the outlet for material treated in said preheater unit.

13. The plant according to claim 3 wherein at least one of said preheater units connected to said kiln gas outlet further comprises means for discharging preheated material into at least one of said preheater units connected to said cooling means at the inlet or at a point between the inlet and the outlet for material treated in said preheater unit.

14. The plant according to claim 4 wherein at least one of said preheater units connected to said kiln gas outlet further comprises means for discharging preheated material into at least one of said preheater units connected to said cooling means at the inlet or at a point between the inlet and the outlet for material treated in said preheater unit.

15. The plant according to claim 7 wherein at least one of said preheater units connected to said kiln gas outlet further comprises means for discharging preheated material into at least one of said preheater units connected to said cooling means at the inlet or at a point between the inlet and the outlet for material treated in said preheater unit.

16. The plant according to claim 1 wherein said means for controlling the air or gas flow through said preheater units comprises at least one of dampers, valves and fans.

17. The plant according to claim 11 wherein said means for controlling the air or gas flow through said preheater units comprises at least one of dampers, valves and fans.

18. The plant according to claim 1 wherein each preheating unit comprises a plurality of cyclone treating units arranged in series superimposed communicating relationship with respect to each other.

19. The plant according to claim 1 wherein said preheating units comprise a first primary preheater unit having a plurality of cyclone treating units and a secondary preheater unit having a single cyclone treating unit having a raw material inlet in a gas or air pipe which extends from the gas outlet of said kiln to the gas inlet of the cyclone treating unit.

* * * * *